United States Patent [19]
Imamura

[11] Patent Number: 6,029,309
[45] Date of Patent: Feb. 29, 2000

[54] VACUUM CLEANER WITH DUST BAG FILL DETECTOR

[75] Inventor: Nobuo Imamura, Kyoto, Japan

[73] Assignee: Yashima Electric Co., Ltd., Kyoto, Japan

[21] Appl. No.: 08/831,252

[22] Filed: Apr. 8, 1997

[51] Int. Cl.[7] .................................................. A47L 9/28
[52] U.S. Cl. ............................................ 15/319; 15/339
[58] Field of Search ..................................... 15/319, 339

[56] References Cited

U.S. PATENT DOCUMENTS

| | | | |
|---|---|---|---|
| 4,370,776 | 2/1983 | Kullik ........................................ | 15/319 |
| 4,399,585 | 8/1983 | Kullik et al. .............................. | 15/319 |
| 5,033,151 | 7/1991 | Kraft et al. ................................ | 15/319 |
| 5,163,202 | 11/1992 | Kawakami et al. ....................... | 15/319 |
| 5,404,612 | 4/1995 | Ishikawa ................................ | 15/339 X |
| 5,572,767 | 11/1996 | Ishikawa ................................... | 15/319 |

*Primary Examiner*—Chris K. Moore
*Attorney, Agent, or Firm*—Smith, Gambrell & Russell, LLP

[57] ABSTRACT

A vacuum cleaner with an indicator for indicating when the dust bag for the vacuum cleaner is full. The indicator includes a turbine provided in a suction pipe, so that the turbine causes an amount of electric power to be generated that corresponds to the amount of negative pressure within the suction pipe. As the dust bag begins to fill, the negative pressure in the suction pipe decreases, and the amount of electric power caused by the turbine also decreases. When the amount of electric power caused by the turbine falls below a predetermined value, the indicator display indicates that the bag is full. If the indicator is employed with a dust sensor, the indicator display can be used to show the amount of detected dust until the bag is full and the operation of the sensor is stopped to allow the display to indicate that the bag is full.

17 Claims, 7 Drawing Sheets

VACUUM CLEANER WITH DUST BAG FILL DETECTOR

BACKGROUND OF THE INVENTION

The present invention relates to a vacuum cleaner. More particularly, the present invention relates to a vacuum cleaner which detects when a dust bag is full with sucked dust.

In the past, an arrangement of a vacuum cleaner is popularly employed that an air intake and an air outlet are provided whereby a vacuum cleaner body, a dust bag and a fan motor are provided at predetermined positions at an interior of the vacuum cleaner body. Specifically, the fan motor is disposed with its outer periphery surrounded by an airtight packing.

When the vacuum cleaner having the above arrangement is employed, a suction force (negative pressure) is generated by the fan motor, air including dust is sucked by the suction force through a suction nozzle, a suction pipe and the air intake, and the dust is collected by the dust bag while the air penetrates the air bag and is exhausted through the air outlet to an exterior of the vacuum cleaner body. Therefore, a quantity of dust collected by the dust bag increases by performing a cleaning operation intermittently or continuously for a long time period, and the dust bag approaches a full condition with collected dust.

When the dust bag is filled with sucked dust, the dust bag is blocked and the air penetration ability of the dust bag is lost. Therefore, the suction force from the fan motor is not transmitted to the air intake so that a condition is realized that air is scarcely suctioned (and cleaning is scarcely performed). Consequently, the collected dust within the dust bag should be removed from the dust bag when such a condition is realized.

A mechanism (i.e., a dust quantity display mechanism) for detecting a condition where the dust bag is filled with collected dust is provided in a conventional vacuum cleaner. As shown in FIGS. 8 and 9, the mechanism includes a casing 41 having a rectangular parallelepiped shape, a cylindrical shape or the like and a communicating pipe 42 provided at a wall of the casing 41, which wall is at one end in a longitudinal direction of the casing 41. The communicating pipe 42 communicates an interior of the casing 41 and a space (the space rear of the dust bag) between the vacuum cleaner body and the dust bag, as is illustrated in FIG. 8. A display body 44 is housed within the casing 41 in a slidable manner and a spring 45 is provided for urging the display body 44 in a direction away from the communicating pipe 42. Further, a transparent window 43 is provided at a predetermined position of a wall which is parallel to the moving direction of the display body 44. The transparent window 43 is used to visually recognize a position of the display body 44. A collected dust quantity display (for example, showing empty, medium and full) 46 for indicating a collected dust quantity is provided at a predetermined position of the casing 41 adjacent to the window 43, as is illustrated in FIG. 9.

When this arrangement is employed, and when a quantity of dust collected within the dust bag is nearly zero, a large quantity of air is suctioned through the air intake by the fan motor which is rotated at high speed, so that a negative pressure within the space rear of the dust bag becomes extremely small. Therefore, the display body 44 is moved by the spring 45 to display that a quantity of dust collected within the dust bag is nearly zero (refer to the display body 44 and the collected dust quantity display 46 in FIG. 9).

On the contrary, when the dust bag is filled with suctioned dust, a quantity of suctioned air through the air intake is almost zero even when the fan motor rotates at extremely high speed, so that a negative pressure within the space rear of the dust bag becomes extremely great. Therefore, the display body 44 is moved against the force of the spring 45 to display that the dust bag is filled with suctioned dust.

Further, when the quantity of dust collected within the dust bag is an intermediate quantity, the negative pressure within the space rear of the dust bag varies in correspondence to the quantity of collected dust. Therefore, the display body 44 is moved in correspondence to the amount of negative pressure and the force of the spring 45 so that a quantity of dust collected within the dust bag is displayed.

The dust quantity display mechanism having the above arrangement is a mechanism which is quite different from the cleaning function which is the essential function of a vacuum cleaner. Therefore, providing the dust quantity display mechanism is performed by adding an extra mechanism to the vacuum cleaner. Consequently, a disadvantage arises that a manufacturing cost of a vacuum cleaner is increased.

Further, as is apparent from the above description, the dust quantity display mechanism must be disposed in the vacuum cleaner body. A disadvantage arises in that visually recognizing the dust quantity display mechanism becomes inconvenient and a forced condition for a cleaning operator. More particularly, a cleaning operator actually performing a cleaning operation performs a cleaning operation while looking at an operating section and the like which is provided at the suction nozzle or the suction pipe. And, during the cleaning operation, the vacuum cleaner body moves in a pulled manner by the suction pipe. Therefore, when the dust quantity display mechanism is to be visually recognized, an operator must turn back to look at the vacuum cleaner body and into the transparent window 43 having an extremely small size in comparison to a size of the vacuum cleaner body. Consequently, visually recognizing the dust quantity display mechanism is inconvenient and a forced condition to a cleaning operator.

SUMMARY AND OBJECTS OF THE INVENTION

It is an object of the present invention to decrease the manufacturing cost of a vacuum cleaner.

It is another object of the present invention to allow an operator to visually recognize a dust quantity display mechanism without giving inconvenience and a forced condition to a cleaning operator.

A vacuum cleaner according to the present invention comprises a vacuum cleaner body and a suction pipe connected to the vacuum cleaner body, wherein the suction pipe guides dust with air to the vacuum cleaner body and has an operation section at a predetermined position thereof. The vacuum cleaner body includes therein a fan motor for generating a suction force for suctioning dust and air, and a dust bag for collecting the dust among the suctioned air and dust. The operation section includes a generator and a control section, the generator being driven by air suctioned by through the operation section so that electric power is generated. The control section includes a collected dust quantity detection and display means, which compares the generated electric power and a predetermined electric power so as to obtain a comparison result, indirectly detects the quantity of dust within the dust bag based upon the comparison result, and then displays the detection result.

When the vacuum cleaner having the above arrangement is employed, dust and air are guided to an interior of the vacuum cleaner body through the suction pipe by operation of the fan motor. Therefore, dust is collected within the dust bag and the generator is operated so that electric power is generated.

When a quantity of dust within the dust bag is small, air smoothly passes through the dust bag so that the quantity of air suctioned by the suction force through the operation section is greater and the amount of electric power generated by the generator becomes greater. On the contrary, when the quantity of dust within the dust bag is great, air does not smoothly pass through the dust bag so that the quantity of air suctioned by the suction force through the operation section is smaller and the amount of electric power generated by the generator becomes smaller.

Therefore, the collected dust quantity indirect detection and display means detects a quantity of dust within the dust bag based upon the amount of electric power generated by the generator which varies depending upon a quantity of dust within the dust bag, and displays the detection result.

As is apparent from the foregoing, the collected dust quantity indirect detection and display means detects and displays the quantity of dust electrically. Thus, the limitation that the display must be provided in the vacuum cleaner body, such as with a conventional display mechanism, does not exist. Instead, the display means according to the invention can be provided at a desired position of the vacuum cleaner. Consequently, the manufacturing cost of the vacuum cleaner is decreased, and the dust quantity display can be visually recognized without giving inconvenience and a forced condition to a cleaning operator.

DETAILED DESCRIPTION OF THE PREFERRED EMBODIMENTS

Figure 1:
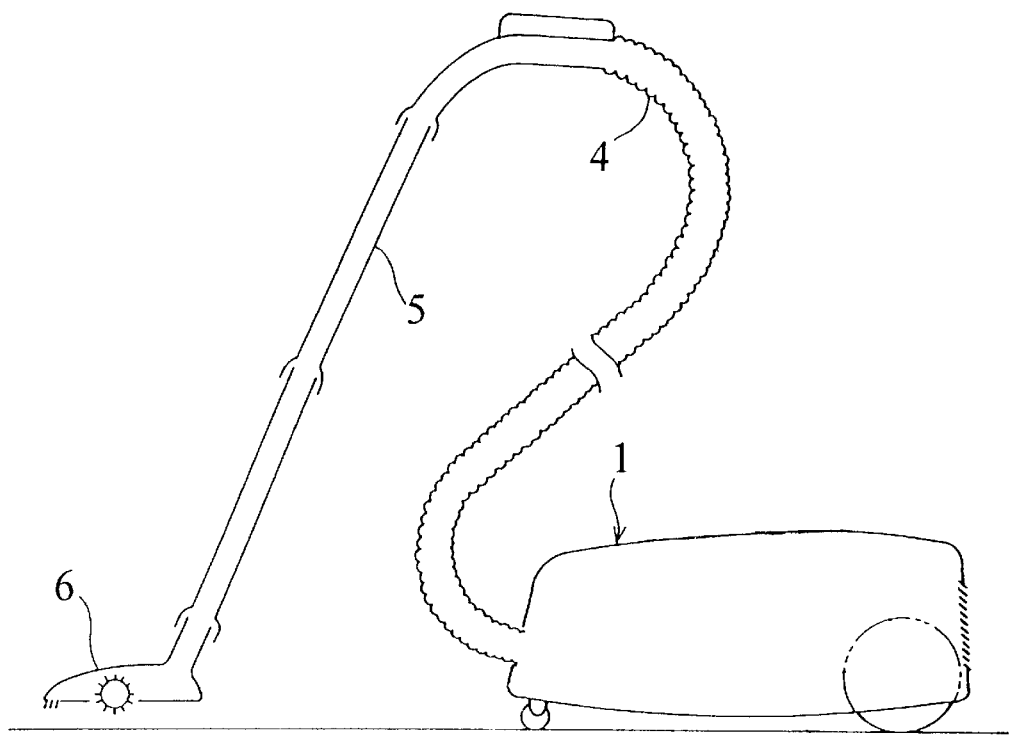
FIG. 1 is a schematic view of a vacuum cleaner to which the present invention is applied.
Figure 2:
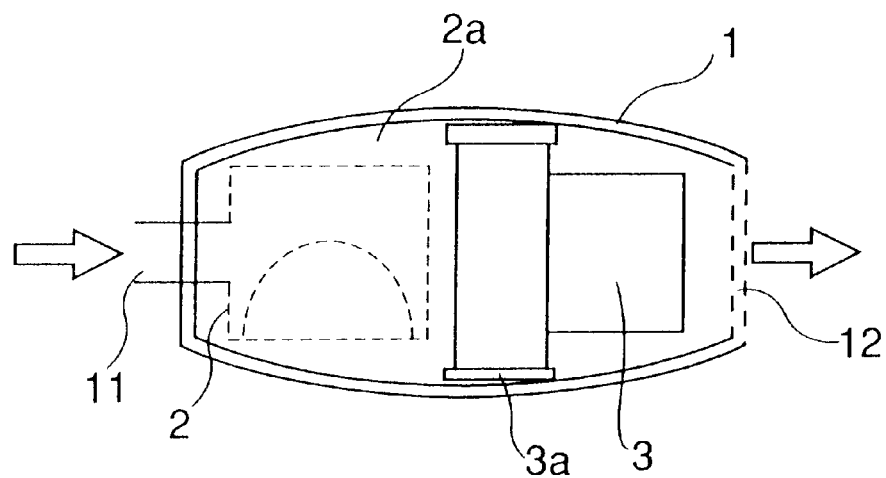
FIG. 2 is a schematic cross sectional view illustrating an interior of a vacuum cleaner body.

FIG. 1 is a schematic view of a vacuum cleaner to which the present invention is applied, while FIG. 2 is a schematic cross sectional view illustrating an interior of the vacuum cleaner body.

The vacuum cleaner includes a vacuum cleaner body 1 which has a dust bag 2 and a fan motor 3 in an interior of the vacuum cleaner body 1, a suction pipe 4 which is connected to the vacuum cleaner body 1 in a removable manner, an extension pipe 5 which is connected to the suction pipe 4 in a removable manner and a suction nozzle 6 which is connected to a leading edge section of the extension pipe 5 in a removable manner.

The vacuum cleaner body 1 has a first air intake 11 at one end and an air outlet 12 at its other end. Within the vacuum cleaner body 1, the dust bag 2 is disposed at the first air intake side in a removable manner and the fan motor 3, which is maintained with an airtight packing 3a, is disposed on the air outlet side. A space between the dust bag 2 and the fan motor 3 is a rear space 2a of the dust bag.

Figure 3:
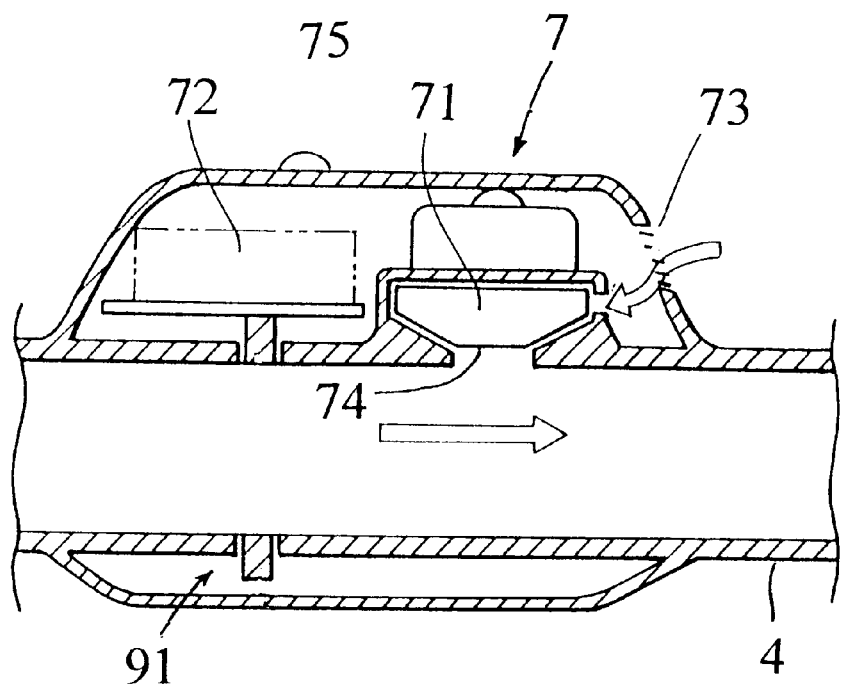
FIG. 3 is a schematic cross sectional view illustrating an interior of an operation section casing according to one embodiment of the invention.

The suction pipe 4 has an operation section casing 7 at a predetermined position. The operation section casing 7 houses a turbine generator 71 and a printed circuit board 72 as illustrated in FIG. 3. The operation section casing 7 has a second air intake 73 for sucking in air which is used to drive the turbine generator 71. The suction pipe 4 has an air passage 74 for guiding air within the suction pipe 4 which has already driven the turbine generator 71. Further, the operation section casing 7 has a light emitting device 75 at a predetermined position. The turbine generator 71 supplies electric power for operation to electric circuitry mounted on the printed circuit board 72, the light emitting device 75, and the like.

Figure 4:
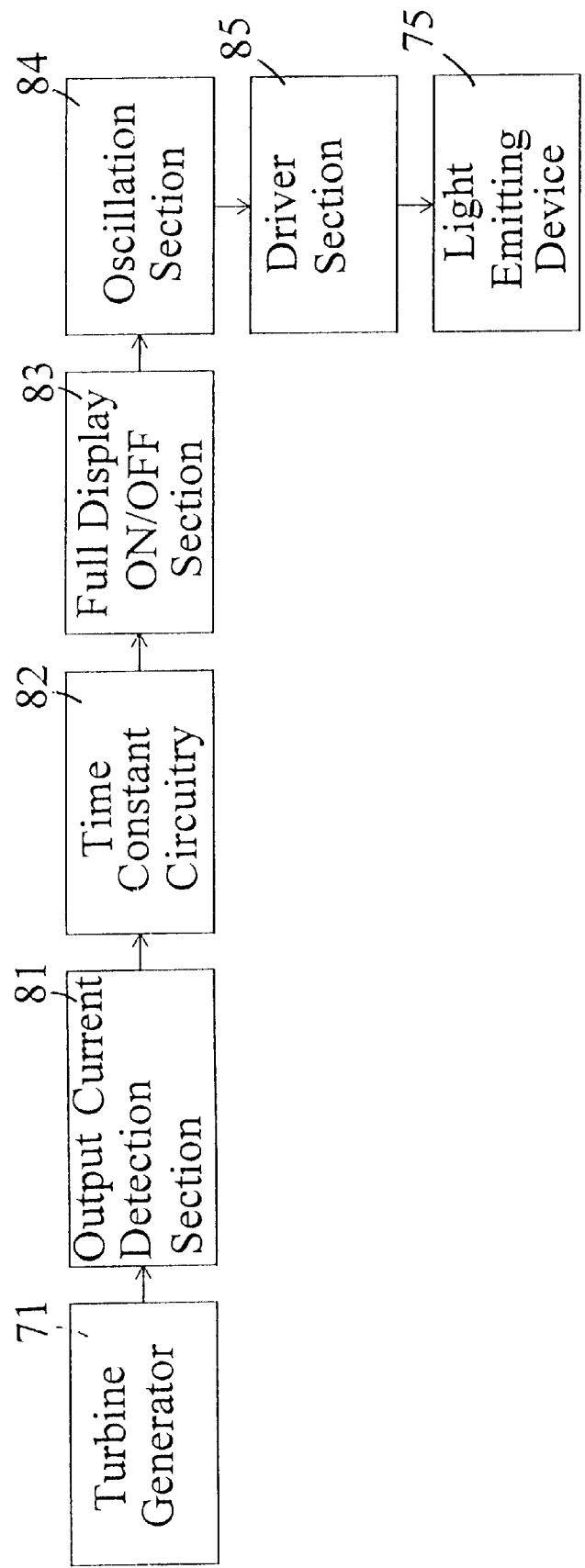
FIG. 4 is a block diagram illustrating an electric arrangement of a dust quantity detection and display apparatus for indirectly detecting a quantity of dust within a dust bag according to one embodiment of the invention.

FIG. 4 is a block diagram illustrating an electric arrangement of an example of a dust quantity indirect detection and display apparatus according to the invention for indirectly detecting a quantity of dust within the dust bag.

In the dust quantity detection and display apparatus, an output current of the turbine generator 71 is detected by an output current detection section 81 so as to obtain a detection result. The detection result then is supplied to a full display ON/OFF section 83 by intervening time constant circuitry 82. An oscillation section 84 is controlled by an output signal of the full display ON/OFF section 83, and an oscillation output of the oscillation section 84 is supplied to a driver section 85 so that the light emitting device 75 is operated and a condition is displayed that the dust bag 2 is filled with dust.

The output current detection section 81 detects whether or not the output current of the turbine generator 71 is smaller than a predetermined value. The time constant circuitry 82 includes one or more condensers which are charged or discharged responding to a detection result signal from the output current detection section 81. The full display ON/OFF section 83 is controlled by a voltage between both terminals of one of the condensers. The full display ON/OFF section 83 controls the oscillation section 84 based upon its output signal.

An operation of the vacuum cleaner having the above arrangement is as follows.

Figure 5:
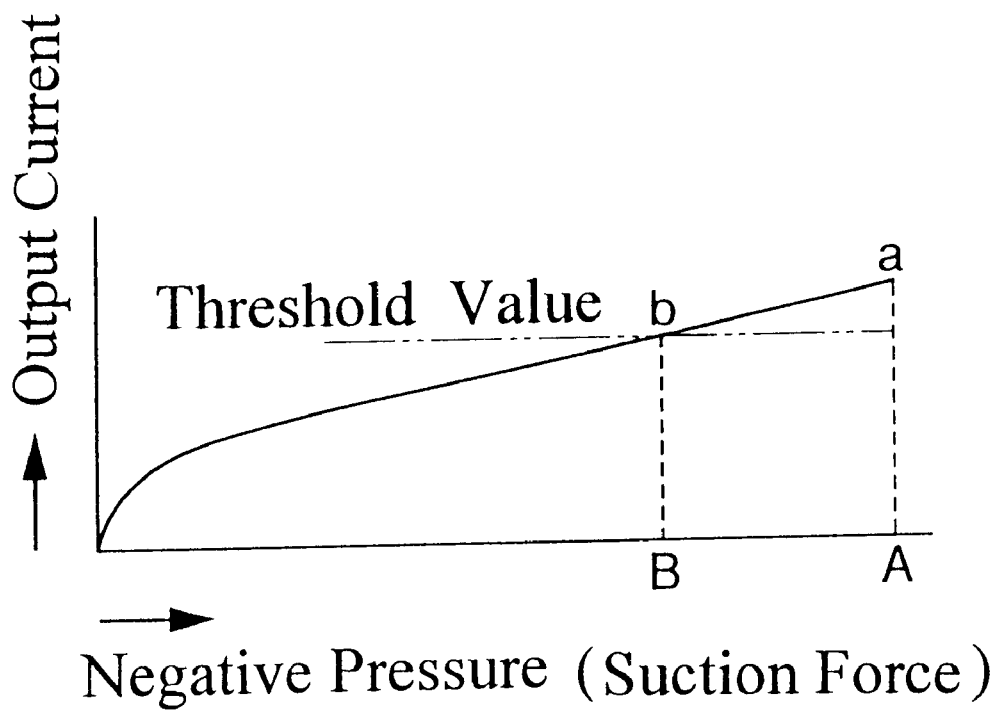
FIG. 5 is a diagram illustrating a relationship between a negative pressure and an output current of a turbine generator.

When the fan motor 3 is driven by the operation of a power switch (not illustrated), dust is sucked with air to the dust bag 2 through the suction nozzle 6, the extension pipe 5, the suction pipe 4 and the first air intake 11. The air passes through the dust bag 2 so that the dust is collected by the dust bag 2. An interior of the suction pipe 4 develops a negative pressure condition by the above air flow, so that air is suctioned to the interior of the suction pipe 4 through the second air intake 73 and the air passage 74. The turbine generator 71 is rotated by the suctioned air flow so as to output a current in correspondence to its rotation speed. The negative pressure and the output current have a relationship in that the output current increases following an increase of the negative pressure, as is illustrated in FIG. 5. Further, the negative pressure increases following an increase of suction force due to the fan motor 3.

When a quantity of dust within the dust bag 2 is small, the air passing ability of the dust bag 2 is high, and the suction force in the suction path comprising the suction nozzle 6, the extension pipe 5, the suction pipe 4 and the first air intake 11 is great. Therefore, the output current of the turbine generator 71 is great.

When a quantity of dust within the dust bag 2 increases, the air passing ability of the dust bag 2 is lowered, and the suction force in the suction path comprising the suction nozzle 6, the extension pipe 5, the suction pipe 4 and the first air intake 11 becomes smaller. Therefore, the output current of the turbine generator 71 becomes smaller.

When the output current detection section 81 detects that the output current of the turbine generator 71 becomes smaller than a predetermined value, the quantity of dust within the dust bag 2 is greater than a predetermined quantity. Therefore, one or more condensers of the time constant circuitry 82 are charged or discharged responding to the detection result signal of the output current detection section 81, and the full display ON/OFF section 83 is controlled by the voltage between both terminals of one of the condensers. The full display ON/OFF section 83 operates the oscillation section 84 by its output signal, which then operates the light emitting device 75 by the intervening driver section 85 so that the light emitting device 75 indicates that the dust bag 2 is full with dust. The light emitting device 75 is provided at the operation section casing 7, so that a cleaning operator can visually recognize that the dust bag 2 is full with dust with a posture which is a normal posture for performing a cleaning operation without giving inconvenience and a forced condition such as looking back to the vacuum cleaner. Of course, the dust quantity indirect detection and display apparatus does not require a complicated mechanical construction like a conventional dust quantity display mechanism, so that a cost of the dust quantity indirect detection and display apparatus is decreased and a manufacturing cost of a vacuum cleaner is decreased.

Therefore, a disadvantage is prevented from occurrence that a cleaning operation is continuously performed even when the dust bag 2 is full with dust and little suction force is realized.

Figure 6:
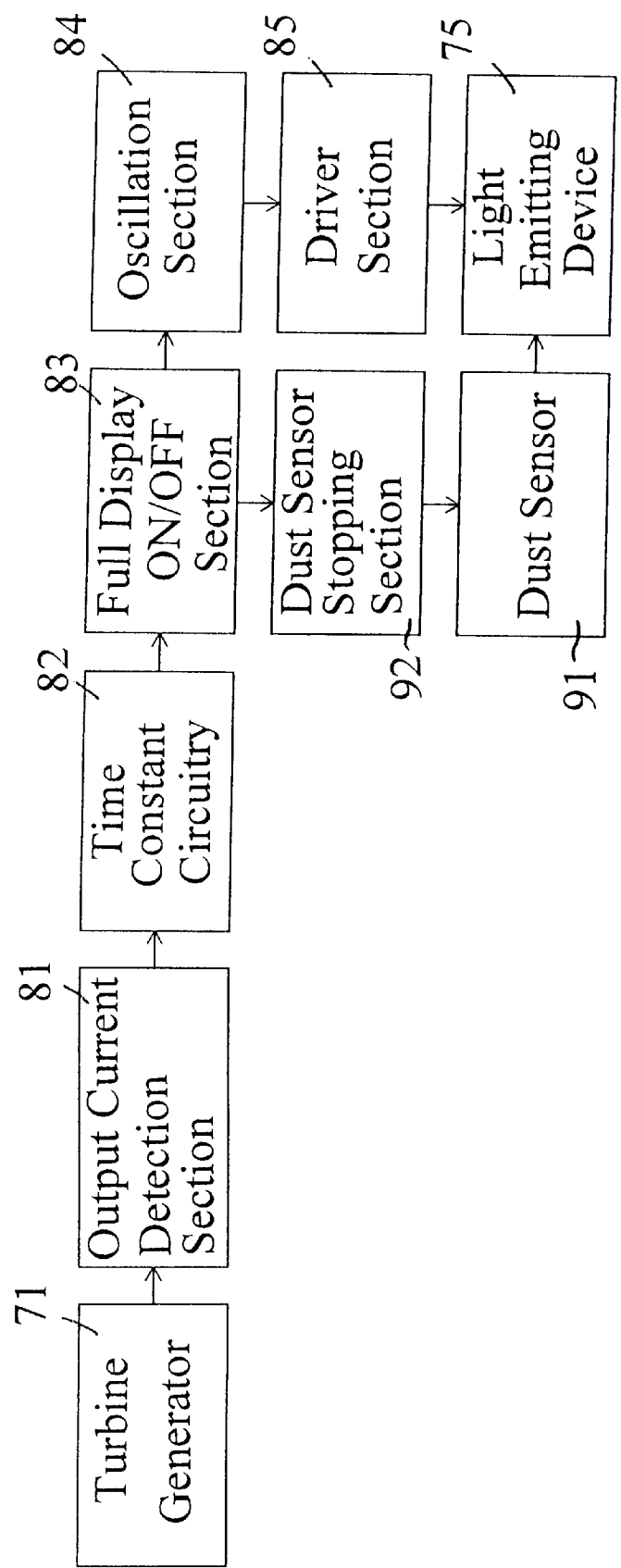
FIG. 6 is a block diagram illustrating an electric arrangement of a dust quantity indirect detection and display apparatus according to another embodiment of the invention.

FIG. 6 is a block diagram illustrating an electric arrangement of another embodiment of a dust quantity indirect detection and display apparatus.

This dust quantity detection and display apparatus differs from the above dust quantity indirect detection and display apparatus in that a dust sensor 91, comprising a light emitting device and a light receiving device, is further provided, the light emitting device 75 being driven based upon a detection result of the dust sensor 91. A dust sensor stopping section 92 also is further provided, which operates based upon the output signal of the full display ON/OFF section 83 and stops a dust detection operation of the dust sensor 91.

Figure 7:
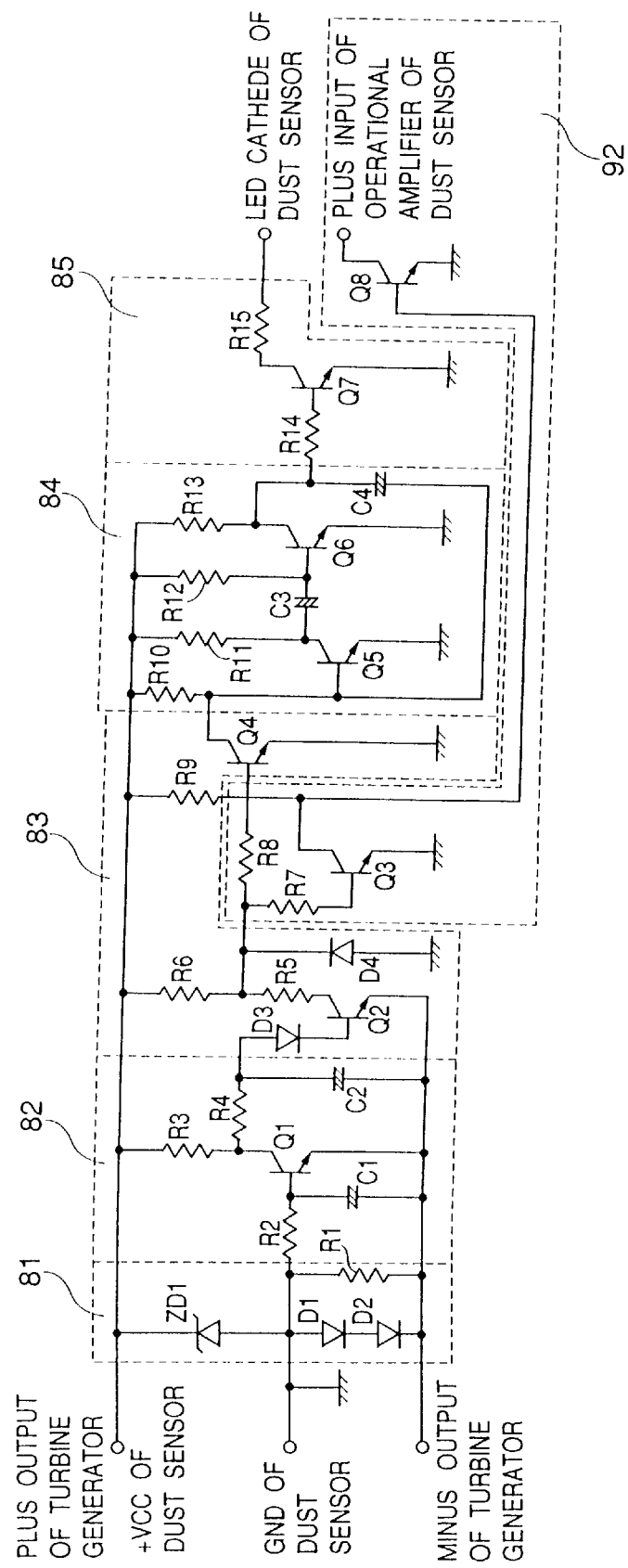
FIG. 7 is an electric circuitry diagram in correspondence to FIG. 6.
Figure 8:
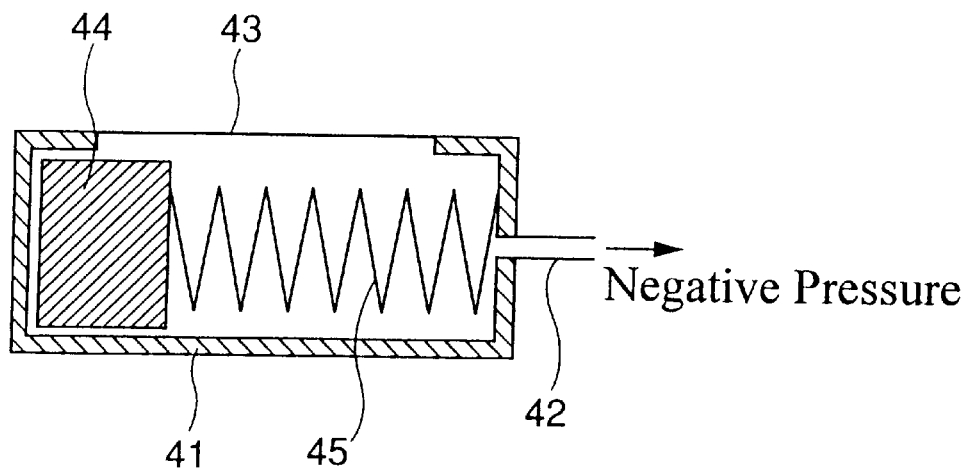
FIG. 8 is a cross sectional view illustrating a conventional dust quantity display mechanism.
Figure 9:
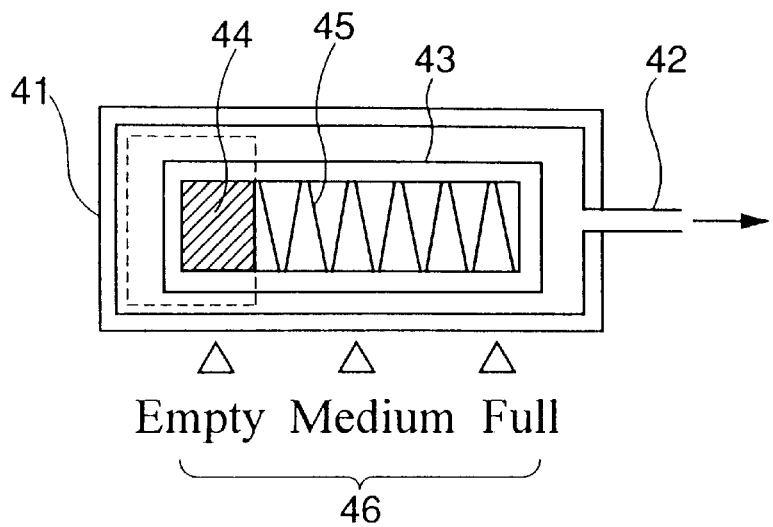
FIG. 9 is a plan view of the conventional dust quantity display mechanism shown in FIG. 8.

FIG. 7 is an electric circuitry diagram corresponding to the block diagram of FIG. 6. However, an arrangement section corresponding to the dust sensor 91 is not illustrated in FIG. 7.

In the output current detection section 81, a zener diode ZD1 and a pair of forward diodes D1 and D2 are connected in series between output terminals of the turbine generator 71. A resistor R1 is connected in parallel to the pair of forward diodes D1 and D2. Further, a connection point of the zener diode ZD1 and the diode D1 is determined to be a ground GND of the dust sensor 91.

In the time constant circuitry 82, a resistor R3 and collector-emitter terminals of a transistor Q1 are connected in series between the output terminals of the turbine generator 71. A resistor R2 is connected between the base terminal of the transistor Q1 and the connection point of the zener diode ZD1 and the diode D1. A condenser C1 is connected between the base terminal and the emitter terminal of the transistor Q1. A resistor R4 and a condenser C2 are connected in series between the collector terminal and the emitter terminal of the transistor Q1.

In the full display ON/OFF section 83, resistors R6 and R5 and collector-emitter terminals of a transistor Q2 are connected in series between the output terminals of the turbine generator 71. An emitter terminal of a transistor Q4 is connected to the ground GND of the dust sensor 91. A diode D3 is forward-connected between a connection point of the resistor R4 and the condenser C2 and the base terminal of the transistor Q2. A diode D4 is reverse-connected between the connection point of the resistors R6 and R5 and the ground GND of the dust sensor 91. A resistor R8 is connected between the base terminal of the transistor Q4 and the connection point of the resistors R6 and R5. A resistor R10 is connected between the collector terminal of the transistor Q4 and the positive output terminal of the turbine generator 71.

In the oscillation section 84, a resistor R11 and collector-emitter terminals of a transistor Q5 are connected in series between the positive output terminal of the turbine generator 71 and the ground GND of the dust sensor 91. A resistor R13 and collector-emitter terminals of a transistor Q6 are connected in series between the positive output terminal of the turbine generator 71 and the ground GND of the dust sensor 91. A base terminal of the transistor Q5 is connected to the collector terminal of the transistor Q4. A condenser C4 is connected between the base terminal of the transistor Q5 and the collector terminal of the transistor Q6. A condenser C3 is connected between the base terminal of the transistor Q6 and the collector terminal of the transistor Q5. A resistor R12 is connected between the positive output terminal of the turbine generator 71 and the base terminal of the transistor Q6.

In the driver section 85, the emitter terminal of a transistor Q7 is connected to the ground GND of the dust sensor 91. A base terminal of the transistor Q7 is connected to the collector terminal of the transistor Q6 by an intervening resistor R14. The collector terminal of the transistor Q7 is connected to a cathode of the light emitting device 75 included within the dust sensor 91 by an intervening resistor R15.

In the dust sensor stopping section 92, the emitter terminal of a transistor Q3 is connected to the ground GND of the dust sensor 91. A base terminal of the transistor Q3 is connected to the collector terminal of the transistor Q2 by an intervening resistor R7. The collector terminal of the transistor Q3 is connected to the positive output terminal of the turbine generator 71 by an intervening resistor R9. The emitter terminal of a transistor Q8 is connected to the ground GND of the dust sensor 91. The base terminal of the transistor Q8 is connected to the collector terminal of the transistor Q3, while the collector terminal of the transistor Q8 is connected to a positive input terminal of an operational amplifier (not illustrated) included within the dust sensor 91.

The operation of the dust quantity indirect detection and display apparatus having the above arrangement is as follows.

When the fan motor 3 is driven by operation of a power switch (not illustrated), dust and air are suctioned to the dust bag 2 through the suction nozzle 6, the extension pipe 5, the suction pipe 4 and the first air intake 11. The air passes through the dust bag 2 so that the dust is collected by the dust bag 2. An interior of the suction pipe 4 develops a negative pressure condition by the above air flow, so that air is suctioned to the interior of the suction pipe 4 through the second air intake 73 and the air passage 74. The turbine generator 71 is rotated by the suctioned air flow so as to output a current corresponding to its rotation speed. The negative pressure and the output current have a relationship in that the output current increases following an increase of the negative pressure, as is illustrated in FIG. 5. Further, the negative pressure increases following an increase of suction force due to the fan motor 3.

When a quantity of dust within the dust bag 2 is small, an air passing ability of the dust bag 2 is high, and a suction force of the suction path comprising the suction nozzle 6, the extension pipe 5, the suction pipe 4 and the first air intake 11 is great. Therefore, the output current of the turbine generator 71 is great.

In this case, a voltage between both terminals of the resistor R1 of the output current detection section 81 increases when the output current becomes great. When the voltage between both terminals of the resistor R1 reaches a first predetermined voltage (for example, about 0.6 volts), the transistor Q1 turns on so that the condenser C2 is discharged. As a result, the transistor Q2 turns off so that the transistors Q3 and Q4 turn on. The transistor Q8 turns off as a result of the transistor Q3 being turned on, so that the dust sensor 91 operates. The dust sensor 91 detects a quantity of dust included within suctioned air suctioned through the suction nozzle 6, the extension pipe 5, the suction pipe 4 and the first air intake 11. The dust sensor 91 drives the light emitting device 75 so as to visually display the quantity of dust.

During the above operation being performed, the transistor Q4 is turned on so that the oscillation section 84 does not operate. Therefore, the light emitting device 75 is not influenced by the above operation at all.

When a quantity of dust within the dust bag 2 is increased by performing a cleaning operation, the air passing ability of the dust bag 2 is lowered so that the suction force through the suction path comprising the suction nozzle 6, the extension pipe 5, the suction pipe 4 and the first air intake 11 and the output current of the turbine generator 71 becomes smaller.

Even when cleaning is performed, the above operation is performed when the voltage between both terminals of the resistor R1 reaches the first predetermined voltage.

On the contrary, when the voltage between both terminals of the resistor R1 does not reach the first predetermined voltage, the transistor Q1 is maintained to be off so that the condenser C2 is charged. When a voltage between both terminals of the condenser C2 reaches a second predetermined voltage (for example, about 1.2 volts), the transistor Q2 turns on so that the transistors Q3 and Q4 turn off. When the transistor Q3 turns off, the transistor Q8 turns on so that the dust sensor 91 stops its operation.

Further, when the transistor Q4 turns off, the condenser C4 is charged. When a voltage of the base terminal of the transistor Q5 reaches a third predetermined voltage (for example, about 0.6 volts), the transistor Q5 turns on and the transistor Q6 turns off. Under this condition, the condenser C3 is charged. When a voltage of the base terminal of the transistor Q6 reaches the third predetermined voltage, the transistor Q6 turns on and the transistor Q5 turns off. Thereafter, charging of the condenser C4, charging of the condenser C3 and turning on and turning off of the transistors Q5 and Q6 in correspondence to the charging are repetitively performed so that the oscillation section 84 outputs a signal which varies its level periodically. During the transistor Q6 being turned off, the transistor Q7 turns on so that the light emitting device 75 is driven. Therefore, a display indicating the dust bag 2 being full with dust is performed.

Consequently, a disadvantage is prevented from occurring where a cleaning operation is continued even when the dust bag 2 is full with dust and when little suction force is realized.

Further, the dust quantity indirect detection and display apparatus employs the time constant circuitry 82. Therefore, even when the output current of the turbine generator 71 momentarily reaches a value which represents the dust bag 2 being full with dust, and when the output current does not continue for a time to some degree, a display indicating the dust bag 2 being full with dust is not performed so that a mis-operation is securely prevented from occurring.

As is apparent from the foregoing description, the dust quantity indirect detection and display apparatus does not require a complicated mechanical arrangement such as a conventional dust quantity display mechanism, and the light emitting device 75 is used both for displaying when the dust bag 2 is full with dust and displaying a quantity of suctioned dust. Therefore, a further decrease in cost of the dust quantity indirect detection and display apparatus is realized and a manufacturing cost of a vacuum cleaner is decreased.

What is claimed is:

1. A vacuum cleaner comprising;

a vacuum cleaner body, a suction pipe connected to the vacuum cleaner body, for guiding dust and air to the vacuum cleaner body, a fan motor provided within the vacuum cleaner body for generating a suction force, a dust bag for collecting dust suctioned by the suction force, a generator, the generator being positioned along the suction pipe such that the generator is driven by air suctioned through the suction pipe to generate an amount of electric power corresponding to an amount of negative pressure within the suction pipe, a dust sensor for detecting dust suctioned by the suction force, and collected dust quantity indirect detection and display means for producing a comparison result signal in response to the amount of electric power generated by the generator being less than a predetermined amount of electric power that stops operation of dust sensor, and for indicating that the dust bag is full in response to the comparison result signal and displaying detection results from the dust sensor when the comparison result signal is not produced.

2. A vacuum cleaner as set forth in claim 1, wherein the collected dust quantity indirect detection and display means produces the comparison result signal only after the amount of electric power generated by the generator is continuously less than the predetermined amount of electric power for more than a predetermined amount of time.

3. A vacuum cleaner as set forth in claim 1, wherein the collected dust quantity indirect detection and display means includes a display light, the display light is continuously active to display detection results of the dust sensor, and the display light intermittently activates to indicate that the dust bag is full.

4. A dust bag fill detector for detecting when a dust bag of a vacuum cleaner is full, comprising:

a generator for positioning along a suction path of a vacuum cleaner, such that the generator will generate an amount of power corresponding to a suction force of the vacuum cleaner;

collected dust quantity indirect detection means for producing a comparison result signal in response to the amount of electric power generated by the generator being less than a predetermined amount;

a dust sensor for detecting dust suctioned by the suction force; and a display responsive to detection results from the dust sensor and the comparison result signal from the collected dust quantity indirect detection means, such that the display indicates that the dust bag is full when the comparison result signal is produced, and indicates the detection results from the dust sensor when the comparison result signal is not produced.

5. A dust bag fill detector as set forth in claim 4, wherein the collected dust quantity indirect detection means produces the comparison result signal only after the amount of electric power generated by the generator is continuously less than the predetermined amount for more than a predetermined amount of time.

6. A dust bag fill detector as set forth in claim 5, wherein operation of the dust sensor is stopped when the comparison result signal is produced.

7. A vacuum cleaner, comprising:

a vacuum cleaner body;

a suction pipe connected to the vacuum cleaner body, for guiding dust and air to the vacuum cleaner body;

the dust bag fill detector as set forth in claim 6 positioned along the suction pipe;

a fan motor provided within the vacuum cleaner body for generating a suction force; and a dust bag for collecting dust suctioned by the suction force.

8. A dust bag fill detector as set forth in claim 5, wherein the display includes a display light, the display light is continuously active to display detection results of the dust sensor, and the display light intermittently activates in response to the comparison signal.

9. A dust bag fill detector as set forth in claim 8, wherein operation of the dust sensor is stopped when the comparison result signal is produced.

10. A vacuum cleaner, comprising:

a vacuum cleaner body;

a suction pipe connected to the vacuum cleaner body, for guiding dust and air to the vacuum cleaner body;

the dust bag fill detector as set forth in claim 9 positioned along the suction pipe;

a fan motor provided within the vacuum cleaner body for generating a suction force; and a dust bag for collecting dust suctioned by the suction force.

11. A vacuum cleaner, comprising:

a vacuum cleaner body;

a suction pipe connected to the vacuum cleaner body, for guiding dust and air to the vacuum cleaner body;

the dust bag fill detector as set forth in claim 8 positioned along the suction pipe;

a fan motor provided within the vacuum cleaner body for generating a suction force; and a dust bag for collecting dust suctioned by the suction force.

12. A vacuum cleaner, comprising:

a vacuum cleaner body;

a suction pipe connected to the vacuum cleaner body, for guiding dust and air to the vacuum cleaner body;

the dust bag fill detector as set forth in claim 5 positioned along the suction pipe;

a fan motor provided within the vacuum cleaner body for generating a suction force; and a dust bag for collecting dust suctioned by the suction force.

13. A dust bag fill detector as set forth in claim 4, wherein operation of the dust sensor is stopped when the comparison result signal is produced.

14. A vacuum cleaner, comprising:

a vacuum cleaner body;

a suction pipe connected to the vacuum cleaner body, for guiding dust and air to the vacuum cleaner body;

the dust bag fill detector as set forth in claim 13 positioned along the suction pipe;

a fan motor provided within the vacuum cleaner body for generating a suction force; and a dust bag for collecting dust suctioned by the suction force.

15. A dust bag fill detector as set forth in claim 4, wherein the display includes a display light, the display light is continuously active to display detection results of the dust sensor, and the display light intermittently activates in response to the comparison signal.

16. A vacuum cleaner, comprising:

a vacuum cleaner body;

a suction pipe connected to the vacuum cleaner body, for guiding dust and air to the vacuum cleaner body;

the dust bag fill detector as set forth in claim 15 positioned along the suction pipe;

a fan motor provided within the vacuum cleaner body for generating a suction force; and a dust bag for collecting dust suctioned by the suction force.

17. A vacuum cleaner, comprising:

a vacuum cleaner body;

a suction pipe connected to the vacuum cleaner body, for guiding dust and air to the vacuum cleaner body;

the dust bag fill detector as set forth in claim 4 positioned along the suction pipe;

a fan motor provided within the vacuum cleaner body for generating a suction force; and a dust bag for collecting dust suctioned by the suction force.

* * * * *